No. 818,556. PATENTED APR. 24, 1906.
F. I. DU PONT.
DEVICE FOR RELATIVE FEED.
APPLICATION FILED AUG. 23, 1905.

Witnesses:
Jas. C. Wobensmith
Howard B. Okie

Inventor:
Francis I. du Pont
By Jno. Crossdale
his Attorney

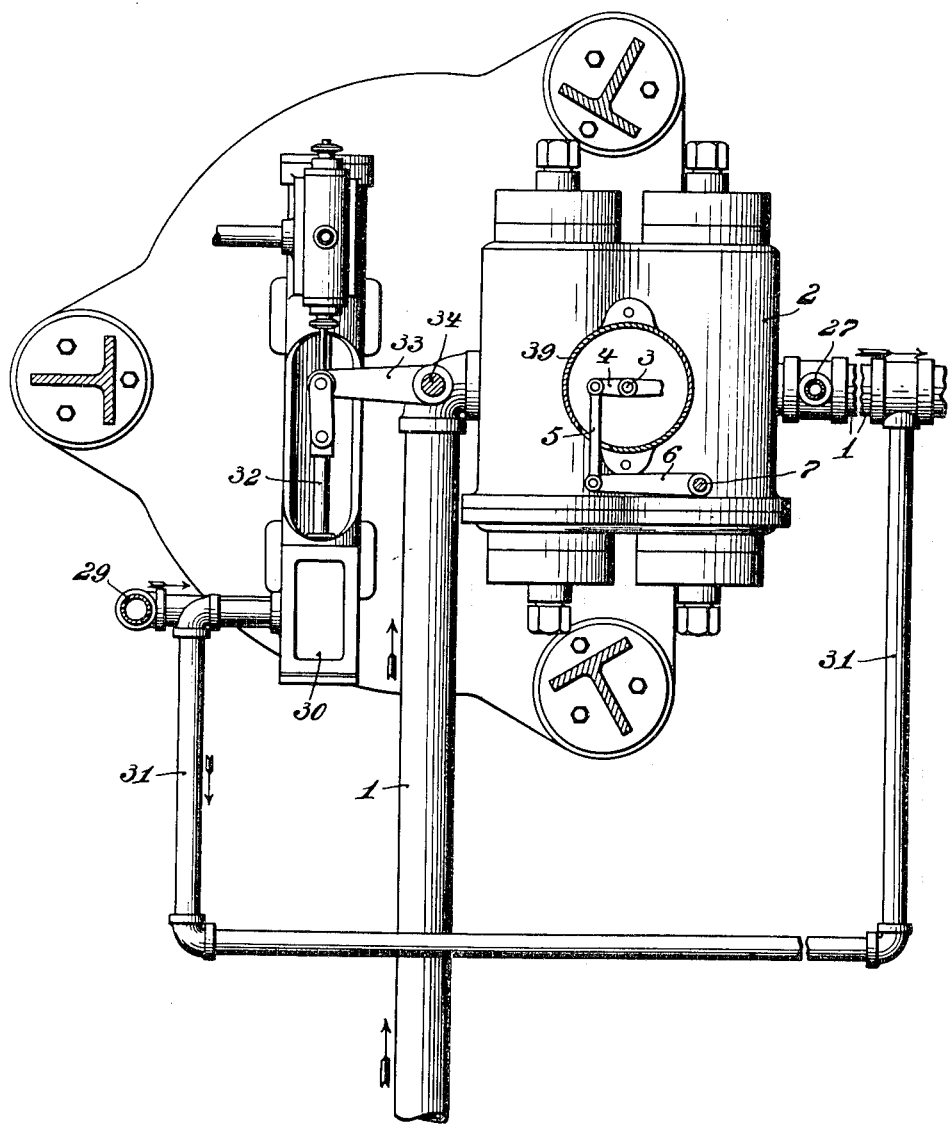

UNITED STATES PATENT OFFICE.

FRANCIS I. DU PONT, OF WILMINGTON, DELAWARE.

DEVICE FOR RELATIVE FEED.

No. 818,556.

Specification of Letters Patent.

Patented April 24, 1906.

Application filed August 23, 1905. Serial No. 275,356.

*To all whom it may concern:*

Be it known that I, FRANCIS I. DU PONT, a citizen of the United States, residing at Wilmington, in the county of New Castle and State of Delaware, have invented a new and useful Device for Relative Feed, of which the following is a specification.

My invention relates to improvements in devices for feeding materials to a liquid relatively to its flow or volume.

My invention is especially applicable for feeding lime or other chemical to a water-main under pressure, said feed to automatically vary in direct proportion to the volume of water flowing through the main.

My improved means includes means for measuring and indicating the volume of water passing through the main and means utilized by the measuring mechanism for controlling the delivery of chemical to the main, so that said feed of chemical will vary directly as the volume or rate of flow in the main varies.

My invention also comprises means for arbitrarily adjusting the connecting mechanism between meter and feed to vary the relation between feed and flow.

Figure 1:
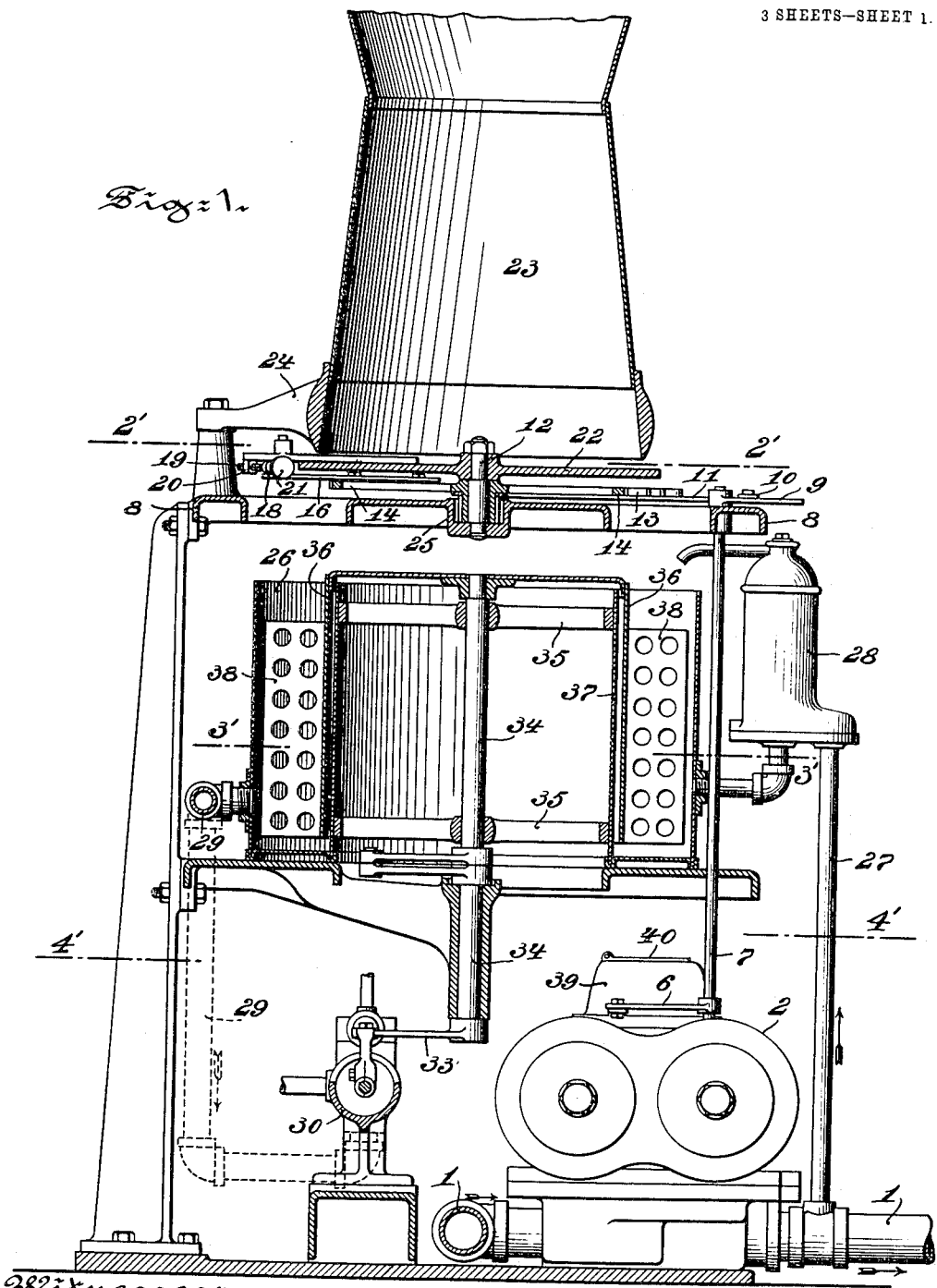
Figure 2:
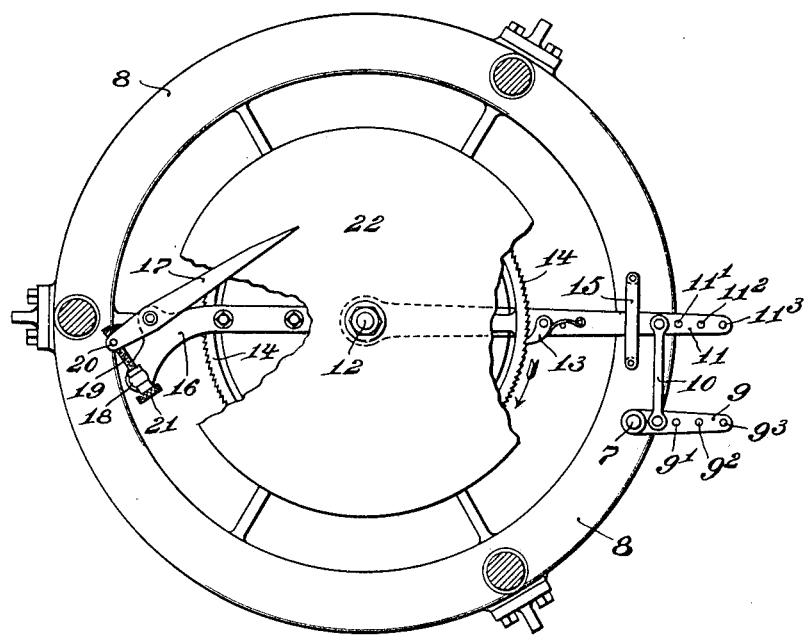
Figure 3:
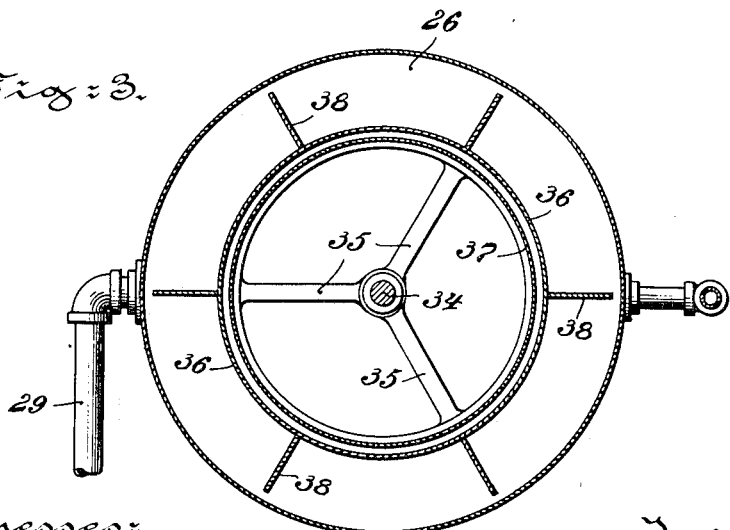

Referring to the drawings, Figure 1 is an elevation, partly in section, of my device.
Fig. 2 is a horizontal section on 2' 2' of Fig. 1. Fig. 3 is a horizontal section on 3' 3' of Fig. 1. Fig. 4 is a horizontal section on line 4' 4' of Fig. 1.

Similar numerals refer to similar parts throughout the several views.

Referring to Figs. 1 and 4, 1 indicates a water-main under pressure. Water flows through this main in the direction of the arrow. The meter 2 is included in this main.
The rotating shaft 3 of this meter is keyed to the crank 4, which is connected by the connecting-rod 5 to the crank 6, which is keyed to the shaft 7, whereby a rocking motion is communicated to shaft 7 by the rotating of shaft 3. Shaft 7 is journaled in an upper ring 8 of the stationary framework of my device and has keyed thereto the crank member 9. This crank member 9 is connected by connecting-rod 10 to the member 11, which is rotatably mounted on the centrally-disposed shaft 12. Upon member 11 is secured the spring-controlled pawl 13, which is adapted to coöperate with the ratchet-wheel 14, also mounted on the shaft 12. It will thus be seen that the rocking of shaft 7, as above described, will cause the oscillation of member 11, which will result in a reciprocation of pawl 13, causing a step-by-step rotative movement of ratchet-wheel 14. The apertures 9', $9^2$, and $9^3$ and 11', $11^2$, and $11^3$ are provided for changing the points of connection between members 9, 10, and 11 to vary the range of movement of pawl 13 for the purpose hereinafter explained. The keeper 15, which is secured to the ring-support 8, forms therewith a supporting and guiding means for member 11, which travels between said ring 8 and keeper 15. Secured to the ratchet-wheel 14 on the opposite side from the pawl 13 is the member 16, carrying near its outer end the pivotally-mounted deflector 17. Mounted on the outer end of arm 16 is the pivoted lug 18, in which is swiveled the screw 19, operating in a similar lug secured at 20 to deflector 17. This screw 19 has a knurled head 21 for convenience of manipulation. The purpose of this screw is to change or vary the angular position of the deflector 17 with respect to the radius of the ratchet-wheel 14.

Above the ratchet-wheel 14, and having a diameter greater than that of the ratchet-wheel, is the stationary table 22, bolted to the shaft 12, which is also stationary and secured to the stationary part 25 of the framework of my device. Above the table 22 is secured the hopper 23, supported by the arms 24, which are connected with the stationary framework of my device. The lower extension of the hopper 23 is spaced a short distance above the top of table 22 and has a diameter less than that of said table. The relative diameters of table and hopper with respect to the space between the lower extension of the hopper and the top of the table are such that the material contained in the hopper may assume its natural slope upon the table within the circumference thereof. The space between the lower edge of the hopper 23 and top of table 22 is just sufficient to admit the deflector 17 projecting therebetween. The deflector lies upon the upper side of the table 22 and is adapted to sweep the same to deflect the material from within the hopper 23 over the edge of table 22.

Beneath the table 22 (see Fig. 1) is suitably supported the annular tank or receptacle 26, the outer circumference of this receptacle being greater, while the inner circumference is less than the diameter of the table, so that material will fall over the edge of the table into substantially the middle portion of the annular channel of tank 26. Water is conveyed from main 1 through pipe 27 and automatic float-valve or water-feeder 28 into the tank 26. The automatic feed 28 serves to maintain the water at a constant level in the tank. As this feed may be of any suitable construction and is not my invention, a detailed description of the same is thought to be unnecessary in this application. The water, with the chemical mixed therein, is conducted through pipe 29 to force-pump 30, by which it is forced back through pipe 31 into the main 1. Connected with the piston-rod 32 of pump 30 is the crank 33, keyed to shaft 34, which carries from the horizontal arms 35, extending from its upper end, the cylinder 36, which extends downwardly into tank 26, surrounding the inner wall 37 of said tank. This cylinder 36 supports a number of apertured vanes or paddles 38. It will thus be seen that with each stroke of the piston-rod 32 the shaft 34 will be rocked, and the paddles 38 will consequently be reciprocated to keep the water and chemical fed into tank 26 in constant agitation, so that the chemical will be more effectually held in suspension in said water as the same is forced back into main 1.

The operation of my device is as follows: The water passing through main 1 and through meter 2 causes the actuation of the operative parts of said meter to indicate the volume of water flowing through it. This indication is shown and recorded in the usual way by dials and pointers located in the box 39, covered by the lid 40, but are not otherwise shown in the drawings, as such devices are well known in the art and were not invented by me. As above described, the operating mechanism of this meter, which is also a motor, is operatively connected with the oscillating member 11 to operate through the pawl 13 the ratchet-wheel 14, which carries the deflector 17. From this it will be seen that the travel of the deflector around the table 12 will be fast or slow in accordance with the volume of flow through main 1. As a result of this, the feed of material from hopper 23 into tank 26 will be in exact proportion with the volume of flow through main 1 at all times, so that no matter how many gallons of water flow through the main per minute or how frequently the rate of flow changes the proportion of chemical per gallon of flow will always remain automatically constant. The preliminary adjustment or any arbitrary adjustment of the amount of feed of chemical to the required quantity of water may be made by changing the angular position of deflector 17 with respect to the radius of table 12. This adjustment is secured by operating the knurled headed screw 19. A further adjustment of the rate of feed may also be secured by changing the connection of connecting-rod 10 with crank 9 and lever 11, as already above described. This changing of connection varies the range of travel of pawl 13 with each reciprocation of member 11, so that the pawl will be made to move the ratchet-wheel 14 one tooth at a time or several teeth at a time, as may be desired. The balance of the operation simply consists in feeding the chemical held in suspension in the water contained in tank 26 back to the main 1 by pump 30.

What I claim is—

1. In combination with a water-main, a water-meter, means for charging a solid material to the main relatively to the flow therein, comprising a cylinder, a platform spaced beneath the cylinder and a deflector actuated by the meter to sweep the platform.

2. In combination with a water-main under pressure, a water-meter, means for charging a solid material to the main, comprising a cylinder, a platform spaced below the cylinder, a deflector operated by the meter to sweep the platform, means for mixing the material fed with liquid not under pressure and means for forcing the liquid with the material suspended therein into the main under pressure.

3. In a feeding device for a water-main under pressure, the combination of a meter included in said main, mechanism operated by said meter for feeding a solid material so that the rate of feed will vary as the flow of water operating the meter varies, a receptacle for receiving the material fed, means for maintaining a supply of water in said receptacle, and means for returning the water mixed with the material from said receptacle back to the main.

4. In a feeding device for a water-main under pressure, the combination of a meter included in said main, mechanism operated by said meter for feeding a solid material so that the rate of feed will vary as the flow of water operating the meter varies, a receptacle for receiving the material fed, means for maintaining a supply of water in said receptacle, means for agitating the water and material mixed therewith in said receptacle, and means for delivering the water mixed with the material from said receptacle back to the main.

5. In combination with a water-main, a meter, means for feeding material to the main relatively to the flow therein, comprising a stationary hopper, a platform spaced below the lower extension of the hopper, a deflector extending over the table and pawl-and-ratchet mechanism operated by the meter for operating the deflector.

6. In combination with a water-main, a meter, means for feeding material to the main relatively to the flow therein, comprising a stationary hopper, a platform spaced below the lower extension of the hopper, a deflector extending over the table, pawl-and-ratchet mechanism operated by the meter for operating the deflector, and means for adjusting said deflector to change said relative feed.

7. In combination with a water-main, a water-meter, means for charging a solid material to the main relatively to the flow therein, comprising a cylinder, a platform spaced beneath the cylinder, a deflector projecting over the platform, means for supporting the deflector having a ratchet-wheel connected therewith and a pawl operated by the meter for coöperating with the ratchet-wheel.

FRANCIS I. DU PONT.

Witnesses:
CLIFFORD V. MANNERING,
C. E. BURCHENAL.